US00H002140H

(19) United States

(12) Statutory Invention Registration (10) Reg. No.: US H2140 H

Rhodes et al. (43) Published: Jan. 3, 2006

(54) BIO-OXIDATION PROCESS AND APPARATUS

(76) Inventors: Mike Rhodes, 26 Woodroyd Street, Mt. Lawley, W.A. (AU), 6050; Paul C. Miller, 21 Finney Crescent, Marmion, W.A. (AU), 6020; Richard Winby, 4 Lovegrove Close, Mt. Claremont, W.A. (AU), 60101

(21) Appl. No.: 09/831,579

(22) PCT Filed: Oct. 22, 1999

(86) PCT No.: PCT/AU99/00917

§ 371 (c)(1), (2), (4) Date: Jul. 2, 2002

(87) PCT Pub. No.: WO00/29629

PCT Pub. Date: May 25, 2000

(Under 37 CFR 1.47)

(30) Foreign Application Priority Data

Nov. 18, 1998 (AU) ..... PP 7180

(51) Int. Cl.
*C22B 3/18* (2006.01)

(52) U.S. Cl. ..... 210/610; 210/220; 210/620; 261/112.1; 261/124; 261/DIG. 70

(58) Field of Classification Search ..... 210/610, 210/620, 220; 261/112.1, 124, DIG. 70
See application file for complete search history.

(56) References Cited

U.S. PATENT DOCUMENTS

| | | | | | |
|---|---|---|---|---|---|
| 1,019,003 | A | * | 2/1912 | Aminoff | 261/123 |
| 4,571,387 | A | | 2/1986 | Bruynesteyn et al. | 435/262 |
| 5,007,620 | A | * | 4/1991 | Emmett et al. | 266/168 |
| 5,093,047 | A | * | 3/1992 | Zeppenfeld | 261/64.1 |

FOREIGN PATENT DOCUMENTS

| | | | |
|---|---|---|---|
| AU | A-18524/99 | | 9/1999 |
| AU | 199918524 | | 9/1999 |
| AU | A-78560/98 | | 11/1999 |
| EP | 0522978 | A1 | 1/1993 |
| EP | 0 522 978 | | 1/1993 |
| WO | WO 98/51827 | | 11/1998 |

OTHER PUBLICATIONS

"Detection Bypolmerase Chain Reaction—Amplification and Sequencing of an Archeon in a Comercial–Scale Copper Bioleaching Plant" by Vasquez et al., FEMS Microbiology Letter, 173, pp. 183–187.

"Quebrada Blanca, Lessons Learned in High Altitude Leaching" by Salomon, VI World Latin American Mining Exposure (EXPOMIN) 2000, Chilean Mining Engineers' Institue in Chile, Technological Innovation Seminar, May 2000, p. 4.

"Compania Minera Cerro Colorado Operational Description and Technological Innovations" by Reyes et al., VI World Latin American Mining Exposure (EXPOMIN) 2000, Chilean Mining Engineers' Institue in Chile, Technological Innovation Seminar, May 2000, p. 9.

"The Bioleaching of Different Sulphide Concentrates Using Thermophilic Bacteria", by Torres et al., Met. Trans B, 26B (1995).

"Biohydrometallurgy" by Rossi, McGraw–Hill Book Company, New York, 1990, pp. 82–85.

* cited by examiner

*Primary Examiner*—Harvey E. Behrend

(57) ABSTRACT

Disclosed is a process and apparatus for conducting bio-oxidation processes for the extraction of metals from metal containing materials in which aeration means, preferably a diffuser means, is employed within a bio-oxidation reactor to maintain bacterial viability and suspension of metal containing materials by introduction of an oxygen containing gas to a non-mechanically agitated reactor.

15 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

BIO-OXIDATION PROCESS AND APPARATUS

This application claims the benefits under 35 U.S.C. § 365 of PCT International Application No. PCT/AU99/00917 filed 22 Oct. 1999 entitled "Bio-Oxidation Process and Apparatus" which was published in English on 25 May 2000 having International Publication No. WO 00/29629, and which claims priority to Australian Patent No. AU PP 7180 filed 18 Nov. 1998.

FIELD OF THE INVENTION

This invention relates to bio-oxidation processes and reactors for the liberation of metals from minerals, especially sulphides, containing them.

BACKGROUND OF THE INVENTION

Metal containing minerals, especially metal sulphides, may be oxidised using specific types of micro-organism, especially bacteria in a bioextraction, particularly a bio-oxidation process. Oxidation of sulphide minerals may be used to put the metals into solution, from for example iron, copper, zinc, nickel and cobalt sulphides, or to release precious metals, such as gold, silver and platinum, encapsulated in metal sulphides, particularly in refractory ores. The process is known as bacterial oxidation, bioextraction, bio-oxidation, bioleaching, or bacterial leaching. In this respect, pyrite, an iron sulphide, and arsenopyrite, an iron-arsenic sulphide are the most common minerals occluding gold in the so-called refractory gold ores and treatment of such materials by microorganisms may therefore assist in liberation of precious metals from refractory ores containing them.

Certain kinds of bacteria used in such processes have been documented and include the mesophiles, *Thiobacillus ferrooxidans, Thiobacillus thiooxidans, Leptospirillum ferrooxidans*, moderate thermophiles, and thermophiles such as *Sulpholobus*.

The above processes are the subject of an extensive literature encompassing papers and patents. However, conventional methods of bacterial oxidation involve oxidation in agitated stirred tanks into which air is introduced or in heaps using rocks with a size of 6 mm or greater in which fine particles may have been agglomerated or heaps using pelletised fine material. An acidic bacteria containing liquor is developed and typically used to irrigate the heap and facilitate metal extraction. The heap leaching technique has been used for many years and Brierley et al have patented a process (U.S. Pat. No. 5,246,486) for a two stage agglomeration process for the recovery of gold from sulphide minerals in heaps where the mineral particles are of large size and not slurried.

Van Aswegen in the article "The Genmin Experience", has described bacterial oxidation in tanks made of stainless steel or other lined steel which contain a slurry of concentrate and water. The tanks are typically 9 meters high and 9 meters diameter and agitated with axial flow impellers which are driven by large motors. Compressed air is piped into the tank and sheared by the impellers Into a fine dispersion of bubbles to maintain a desired dissolved oxygen concentration in the slurry. A variety of impeller types other than axial flow may be used such as turbines.

The present applicant has found that such methods suffer from a number of disadvantages. Primary among these is the high power consumption and high capital cost encountered in employing bacterial oxidation reactors agitated by impellers.

Although proposals have been made to employ diffusion means to maintain particles in suspension, notably in Envirotech U.S. Pat. Nos. 4,728,082, 4,732,608, 4,968,008, 4,974,816 and 5,007,620, it is uniformly recognised that there is a need to provide some mechanical means, for example in the form of a rake to ensure that significant quantities of solids are not deposited on the floor of the reactor vessel, reducing reactor efficiency.

SUMMARY OF THE INVENTION

It is the object of the present invention to provide an improved process and apparatus for carrying out bacterial oxidation especially of metal sulphide minerals.

With this object in view, the present invention provides, in its first aspect, a process for recovering metals from materials containing them by bio-oxidation including treating, in a non-mechanically agitated reactor, a slurry containing a metal containing material with bacteria capable of promoting extraction of metals from said metal containing material; and maintaining said material in suspension and bacterial viability in the reactor by introducing an oxygen-containing gas to the slurry within the reactor by aeration means.

The aeration means advantageously introduces gases to the reactor in the form of bubbles of controlled size, generally of small diameter to enhance mass transfer of oxygen to bacteria. It will be understood, in this respect, that the bacterial oxygen demand is extremely high and oxygen diffusion characteristics important. Control of bubble size by shearing is not employed.

Suitable aeration/agitation means may particularly and advantageously include diffusers as described hereinbelow. Diffusers are devices that will both introduce air or other gases to the slurry by diffusion mass transfer of gas from fine bubbles—advantageously of controlled size—to the solution or slurry and maintain solids in suspension for bacterial oxidation. Dome, tubular, disc or doughnut type diffusers may appropriately be used in accordance with the invention.

Aeration means may include hydraulic shear devices. In such devices, very fine bubbles are formed by dislodgment thereof before full development under the influence of shear forces.

Surface aerators such as paddle aerators may be used to break liquid surface and assist in entrainment of gas such as air in the bulk reaction slurry. Reactor configuration may be varied to maximise aeration.

A further alternative would be the use of liquid jets where a stream of liquid from a reactor is pumped through a venturi which draws air into the liquid thereby aerating it. The aerated liquid is returned to the reactor.

In a particularly preferred embodiment, a gas appropriate for maintenance of bacterial viability include oxygen containing gases, such as air, oxygen enriched air or oxygen; optionally, with addition of carbon dioxide, such as air enriched with carbon dioxide, may be introduced to the aqueous solution by aeration means, particularly diffusers.

Where a bio-oxidation process is involved, various chemolithotrophic bacteria may be employed. Various categories of bacteria may be employed in these processes. These categories are as follows:

1) mesophiles which are suitable for oxidation in the range 10° C. to 45° c.

2) moderate thermophiles, which oxidise the sulphide minerals in the range 40° C. to 60° C.; and 3) thermophiles which oxidise from above 50° C. to 90° C.

The process may be carried out employing any one or more such microorganisms, especially bacterial species, often referred to as a single or mixed culture respectively, which will oxidise sulphides or other minerals or metal containing materials in the required temperature range. Preferred mesophiles for use in bacterial oxidation are *Thiobacillus ferrooxidans, Thiobacillus thiooxidans* and *Leptospirillum ferrooxidans*. Most of the moderate thermophiles do not have specific names, but some have been referred to as *Sulphobacillus thermooxidans*. Preferably, the thermophilic bacteria will be of the type *Sulpholobus brierleyi, Sulpholobus BC*, and *Sulpholobus acidocaldarius*. Notwithstanding naming of species herein, similar iron and sulphur oxidising bacteria within the overall temperature range of 0° C. to 90° C. identified but not yet named are included within the scope of the present invention. The process is most advantageously conducted generally in the temperature ranges for which the bacteria are tolerant as described above. Reaction may be undertaken in the mesophilic, moderately thermophilic or extreme thermophilic temperature range.

Though the process may be employed exclusively for metal liberation, pre- or post- treatment by other metallurgical operations, such as CIP or CIL processes for recovery of precious metals for example, may be employed where desirable. Solid/liquid separation may typically follow bio-oxidation, liquor being further treated for metal recovery.

The process may be conducted in any suitable reactor, including those types of reactor already generally known to the art, operating advantageously on a continuous basis. Aeration may be achieved by including, in such reactors, suitable aeration means even in large capacity systems.

However, it is intended that no mechanical means be employed within the reactor, that the introduction of gas be employed as the sole agency by which particles are maintained in suspension without significant build-up of mineral containing particles constituting the metal containing material on the floor of the reactor. Such a reactor may be said to be rakeless.

In a particularly preferred embodiment, the metal containing material is, for example, a non-ferrous base metal sulphide ore, such as a copper, nickel, zinc, lead or cobalt containing ore, including mixed or polymetallic ores, or a refractory gold ore incorporating occluding sulphides amenable to dissolution by bacterial action. Other materials in this class may include flotation concentrates, gravity concentrates, tailings, precipitates, mattes and sulphidic fume. However, the above process is also suitable for carrying out bacterial oxidation and bioleaching of non-sulphide ores and other generally inorganic materials containing metals in economic concentrations, where suitable bacteria are available to carry out the process. For example, without intending to limit the invention in any way, bioleaching of rare earth ores, oxidic manganese ores and phosphate rock is possible in accordance with process of the invention.

In a further embodiment of the invention, there is provided a reactor system for bio-oxidation treatment of metal containing materials including at least one rakeless reactor having a reaction volume provided with aeration means for introducing an oxygen containing gas for maintaining said metal containing material in suspension and bacterial viability.

The reactor may take various forms, though incorporates no mechanical means of agitating the reactor volume, and may for example be in the form of tanks or vats. In this case, the reactor may be fabricated from suitable materials, steel, metal alloys or concrete optionally lined with an acid resistant medium. Additional materials of construction include wood, plastic, fibre-glass or any suitable aeration means may be as known in the art.

Alternatively, a reactor may take a reservoir configuration being formed by excavation above or below ground. In such a case, the reservoir may be lined with a liquid impermeable barrier, such as clay or plastic membrane, to prevent solution entering the surrounding ground or rock. The reactor may be built from rock or other suitable material above the surrounding ground surface.

In a reservoir configuration, though the following may be applicable to other types of suitable reactor, the reactor is preferably rectangular in plan section. The reactor may be tapered towards either end. When viewed from an end the reactor may also be rectangular in section though other shapes may be employed. The walls of the reactor may be substantially vertical or sloped. The depth of the reactor may typically be between 4 and 8 meters, and the width between 5 and 20 meters though both dimensions could be larger or smaller. Very large reactors, possibly having length greater than 100 meters, may be built and a number of reactors may be employed. Such reactor systems may be combined in series or operated in parallel.

The base of the reactor may be sloped so that there is a gradient from the feed end at which ore or other metal containing material is fed into the reactor to the discharge end. This slope may be a descending slope. The gradient of the reactor may be variable. This may assist in transfer of particles from feed to discharge. Volume of the reactor is calculated in dependence upon the rate at which the metal containing material or mineral is being treated.

Aerating means, or diffusers, may be located at even spacings along the base of the reactor. A concentration of diffusers may be determined as a function of oxygen demand in the reactor.

Feed may be introduced at one end of the reactor through multiple points located along the width of one end. Distribution of slurry to these points may be via a ring main or splitter of conventional type.

However, it is not intended to restrict possible reactor designs to the above configurations and other configurations could be employed.

BRIEF DESCRIPTION OF THE DRAWINGS

Description of preferred embodiments of the invention now follows. The description is made with reference to the accompanying drawings in which.

DETAILED DESCRIPTION OF PREFERRED EMBODIMENTS

Figure 1:
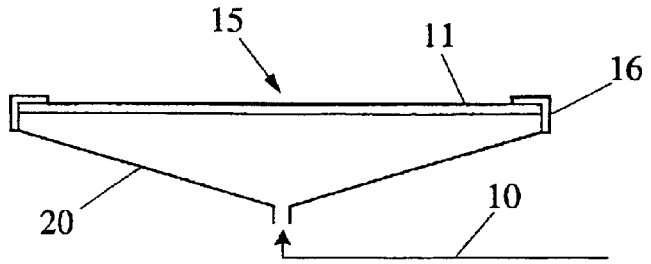
FIG. 1 is a side sectional view of an aeration means to be used in accordance with a first embodiment of the process of the present invention.

Referring specifically to the FIGS. 1 to 4, the gas is delivered through diffusers, i.e. a means for diffusing a gas into the liquid portion of a slurry or solution. Typically, compressed air—though other gases as described above may be suitable—is blown through gas supply line 10 to the diffuser unit 1 passing through a perforated wall 11 thereof forming air bubbles which serve to transfer oxygen and carbon dioxide into a slurry 2 in a reactor (not shown) for bacterial respiration and for oxidation of minerals. Gas supply line 10 may service a number of reactors. A slug flow introduction of air or gas to the reactor, that is, without control over bubble size at introduction to the reactor, is not desirable and is, most advantageously, to be avoided.

Diameter or size of the perforations 13 in wall 11 dictates bubble size, as desired, in a controlled manner. The smaller the bubble size the greater the surface area per unit of volume providing efficiency of gas-liquid contact allowing the high values of oxygen transfer that are necessary for efficient bacterial oxidation. Bubble size is to be maintained at 7.5 mm average diameter or less, preferably 5 mm average diameter or less.

Disc, doughnut or tubular designs may be employed, the first two types being shown in FIGS. 1 to 4.

Figure 2:
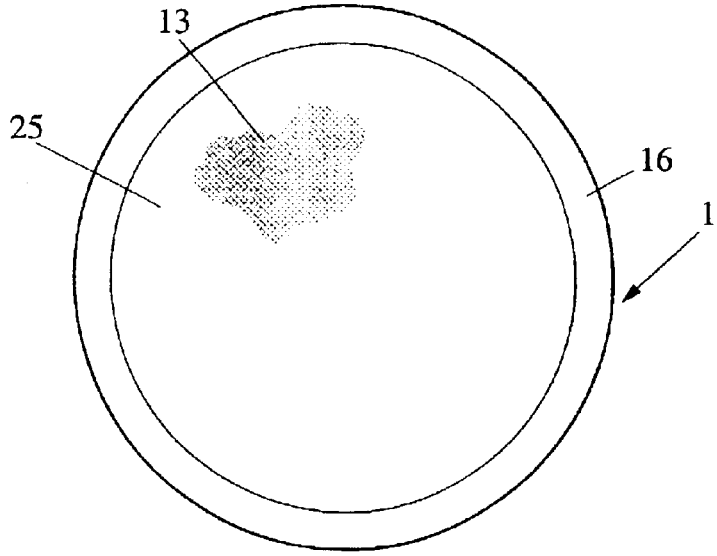
FIG. 2 is a plan view of the aeration means shown in side section in FIG. 1.

A disc diffuser, as seen in side section in FIG. 1 and plan in FIG. 2, is manufactured from a flexible membrane 15 that closes when no air is being delivered. This ensures that substantially no slurry enters gas supply line 10 during processing. The membrane 15 may be retained in position by a retaining device such as a clamping ring 16 which fixes the membrane in position 15 about an outlet 20 of the gas supply line 10. As the membrane 15 expands with air flow, perforations in the form of pores in the membrane open allowing air flow therethrough. The pores 13 may advantageously be microscopic, of the order of 1 to 5$\mu$ in diameter. As a result, impeller action is not required to shear air slugs to an appropriate bubble size distribution to optimum transfer of oxygen to the slurry. Further the mass transfer occurs in a readily controllable fashion and the bubble size may be controlled by selecting a membrane or other material (see below) with desired pore or hole size.

Figure 3:
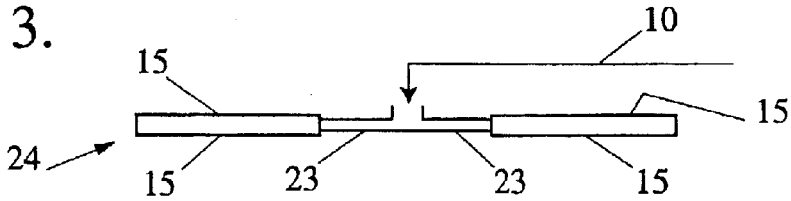
FIG. 3 is a side sectional view of an aeration means to be used in accordance with a second embodiment of the process of the present invention.
Figure 4:
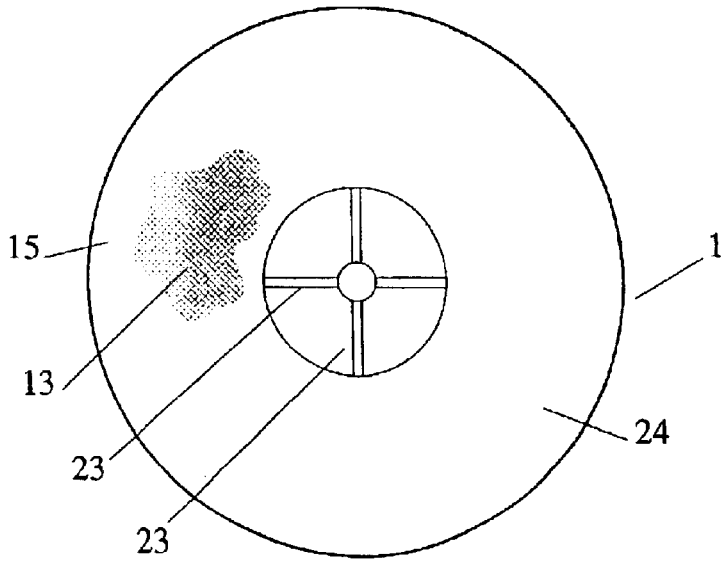
FIG. 4 is a plan view of the aeration means shown in side section in FIG. 3.

A doughnut shaped diffuser is shown in side section in FIG. 3 and plan in FIG. 4. Again, a membrane 15 is employed which has the sarne characteristics as discussed above. However, here the gas supply line 10 serves further supply lines 23 feeding the doughnut shaped tube 24, the walls of which are formed from membrane 15 thereby providing greater contact area of membrane 15 with solution or slurry.

Characteristics of membrane 15 may include flexibility, relatively low cost, durability and easy replacement. The membrane 15 may be formed from acid resistant rubber or other polymers with a pore size distribution as desired for use in the process. The membrane may be manufactured in a known manner in the field of membrane technology.

A further type of diffuser is of typically dome shape and manufactured from plastics or ceramics. The material is perforated with holes of similar diameter to that above that are fixed and open all the time allowing air to flow therethrough to form a bubble swarm in the slurry within the reactor.

A particularly effective type of diffuser is tubular with the tubular body perforated with holes for gas exit preferably having a U-shaped configuration. The tubular body may be connected to the gas supply line and may be formed from a membrane or suitable plastic or ceramic material.

Diffusers suitable for the application will typically be sized to allow a sufficient volume of gas to be diffused into the slurry to achieve between 0.5 and 15 mg/l dissolved oxygen concentration in the slurry depending upon the oxygen requirement of the bacteria used in the bio-oxidation process. There may be provided a number of diffusers as necessary to maintain solids in suspension and supply sufficient gas for oxidation.

Reactor configuration may be selected to achieve optimal aeration. Diffuser(s) 24 may be placed adjacent, that is at, or just off, the base of the reactor, if applicable, spaced at intervals—possibly with different rates of gas introduction—to give a suitable bubble distribution for the material being treated. The diffusers are fixed in position. Under different circumstances, the number of diffusers required to maintain the solids in suspension may be greater than that required for oxidation, at other times the number required may be lower. A uniform arrangement throughout the reactor base may be preferred. Conveniently, the number of aeration means or diffusers per unit area within the reactor may vary such that there is a greater proportion at the feed end of the reactor where higher rates of bacterial oxidation would be expected than at the discharge end.

Figure 5:
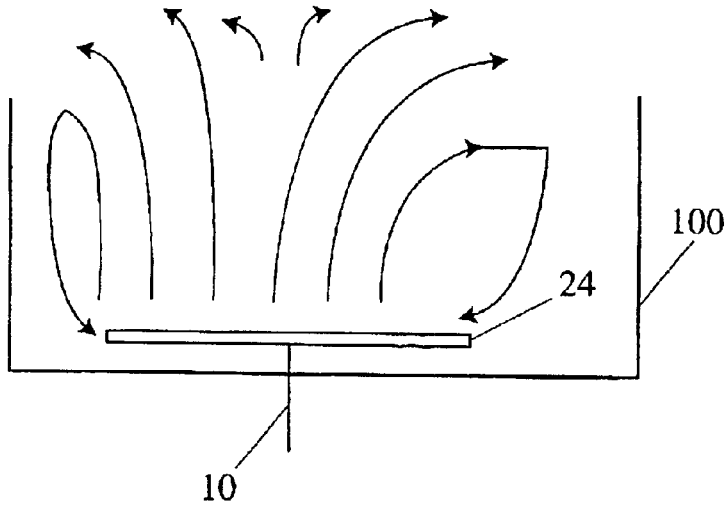
FIG. 5 is a schematic diagram showing flow circulation in a reactor, including a tubular aeration means, as operated in accordance with a third embodiment of the process of the present invention.
Figure 6:
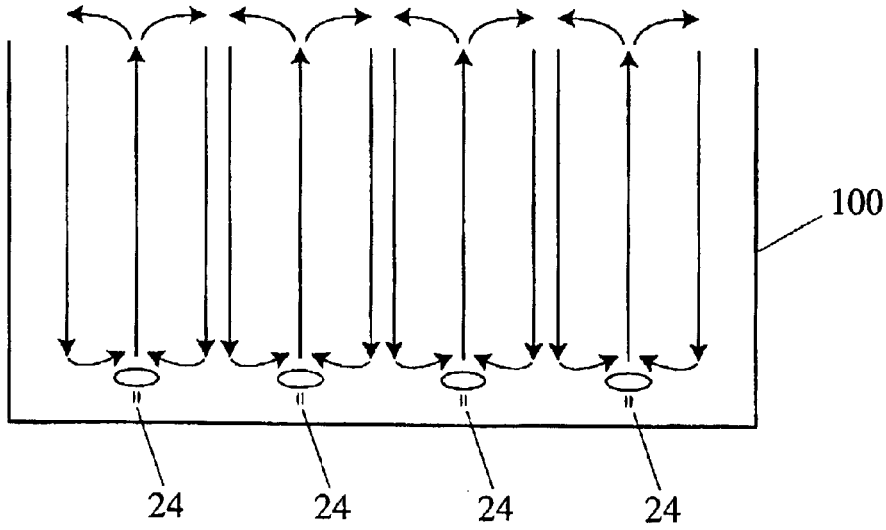
FIG. 6 is a schematic diagram showing flow circulation in a reactor including disc aeration means, as operated in accordance with a fourth embodiment of the process of the present invention.

FIGS. 5 and 6 show, without intending to limit the invention, likely flow circulation patterns for a number of tubular and disc diffusers located in a reactor 100. It may be understood that each arrangement allows efficient mixing and bacterial/solid contacting though a disc diffuser arrangement may be preferred.

Figure 7:
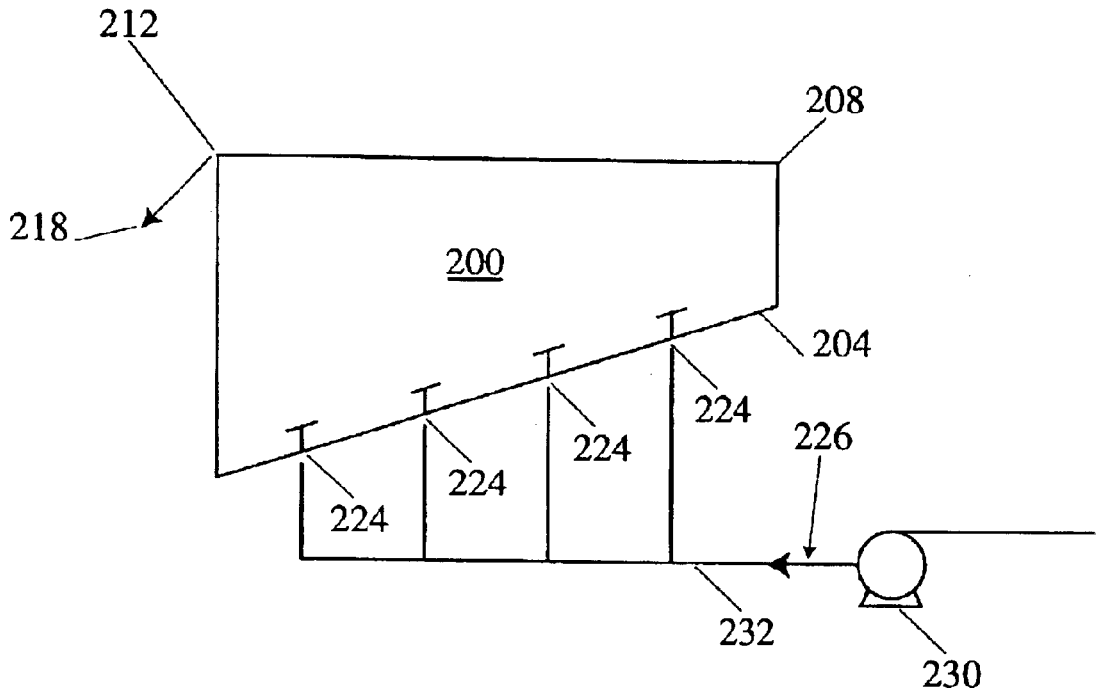
FIG. 7 is a side schematic diagram showing another embodiment of a reactor according to the present invention.
Figure 8:
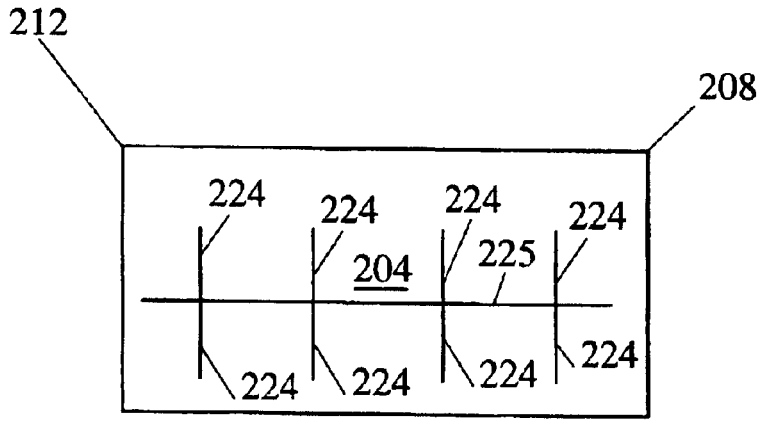
FIG. 8 is a plan schematic diagram for the reactor of FIG. 7.

FIGS. 7 and 8 show a reactor 200 of rectangular plan having a sloped base 204. The gradient of base 204 descends from feed end 208 (to which input slurry is introduced) to discharge end 212 (at which the output leached particles are removed). An overflow liquor stream 218 is removed to a metal recovery stage (not shown).

A number of diffusers 224 of tubular type are located evenly spaced along the base of the reactor 200.

Diffusers 224 are supplied with air by line 232 air is induced to flow through line 232 by induction fan 230. Carbon dioxide supplement is introduced by line 226 to line 232. Suitable diffusers 224 are of tubular fine bubble membrane type available in Australia from MRE, Adelaide, the distributor of Enviroquip ® tubular diffusers. Such diffusers are particularly suitable for attachment to PVC pipe which may be conveniently used for line 232.

The tubular diffusers 224 are supplied with oxygen containing gas by a main pipe or manifold 225 of which the tubular diffusers 224 form lateral extensions covering the base of the reactor 200 as shown in FIG. 8. As the core of each diffuser 224 fills with water they will stay on the base of the reactor 200.

Diffusers may also be provided in pipelines communicating with a reactor, for example those connecting the reactor with others in the reactor system. Alternatively, gas may be introduced at these points by other suitable means. This may be especially applicable in the case of a heap or dump leaching process in which ore particles are not placed into suspension in the leach liquor.

Materials treated by the process and reactor systems of the invention may include ores, concentrates obtained from ores, tailings, wastes and other materials having sufficient metal values present to economically remove the metal or to remove metals detrimental to the environment or other processes. It is to be understood that the present invention is not limited to the treatment of sulphides.

The metal value containing material may require to be pre-treated, for example crushed, to a size sufficiently small to enable it to be ground in conventional comminution equipment such as ball mills.

Conveniently, the solids requiring oxidation are ground to a particle size sufficiently fine for the gas to be effectively used in maintaining a suspension thereof and without allowing significant build-up on the floor of the reactor. Typically, grinding to a suitable particle size distribution is necessary to meet this criterion. The size of the product after grinding is preferably 90% passing 50 microns or less. It is advantageous for the ore or other metal containing material to be ground in an ultra fine grinding machine to particle size between 80% passing 2 microns and 80% passing 30 microns in accordance with a further embodiment of the invention. The bottom particle size is as small a size as is practically attainable by grinding. The size of the particles should be chosen to be the optimum for maintaining the solids in suspension and carrying out a bacterial oxidation process.

Conveniently, after crushing and/or grinding the material concentration may occur by gravity, flotation or other beneficiation processes to increase the proportion of the sulphides or other desired minerals in the product. However, the process is equally applicable to the treatment of concentrates of residue produced by others and comminution pre-treatment is not necessarily required in each case.

The ground metal containing ore or concentrate is preferably slurried with an aqueous solution, especially water. Slurries from grinding may be diluted within additional water and pumped into the reaction zone in which the bio-oxidation process is to take place. The pulp density of the slurry introduced to the reactor of the invention may be of great importance to the attainment of the object of the invention, accordingly a range of 5 to 15% or upward may be selected. At lower pulp density, as stated, efficient bacterial activity may be achieved as toxic effects due to high ionic concentration; and/or mechanical grinding of bacteria are avoided. Leaching is enhanced by the very low shear, low ionic concentration environment. Bacteria are ideally previously added to the reactor in the form of a culture with a mineral and grown in sufficient numbers so that there are preferably between $10^5$ and $10^9$ bacteria per milliliter of slurry. The bacteria may be maintained in the reactor according to accepted practice or by a method of immobilisation.

Preferably the retention time in the reactor is 2 to 8 days. The retention time may be longer to allow treatment of less finely ground material, which requires a longer time to be processed, or to achieve higher levels of mineral oxidation and dissolution of the metal. The amount of gas introduced to the slurry may be changed in accordance with retention time but this is not essential.

Conveniently, the bacterial oxidation process is carried out in an acidic solution which is suitable for growth of the specific bacteria, for example thiobacilli, used. This is expected to be in the range of 0.5 to 3.0. Preferably, the pH will be in the range 0.8 to 2.5. An initial acid addition may be required at the start of the process to neutralise acid consuming minerals and maintain the pH in the required range. The process of oxidising sulphide minerals produces acidic by-products and it is likely that the pH will decrease during processing. If necessary, the pH may be maintained in the required range by controlled addition of a base or basic agent such as lime, limestone or any other suitable alkali.

Where the material to be treated is not a sulphide, reaction may be carried out under alkaline conditions. In these situations the pH is to be kept at a level suitable to the specific leaching conditions.

Support of the bacteria is likely to acquire the addition of nutrients to maintain growth. Typical nutrients to be introduced to the reaction zone are nitrogen, sulphur and phosphorus containing materials such as ammonium sulphate, potassium dithiophosphate and magnesium sulphate. In addition, other nutrients may be required for specific ores and concentrates as is known in the art.

Further, as oxidation of sulphide minerals is an exothermic process, heat will be released during bacterial oxidation. This may be a problem where ores are treated but may be especially true where an enriched sulphide concentrate is treated. In this case, the release of heat may increase the temperature of the slurry in the reactor above that tolerated by the bacteria, especially thiobacilli. *Sulpholobus* bacteria are more temperature tolerant. Therefore, the reactors are typically to be provided with cooling systems. Water may be a suitable coolant and the cooling system may be direct, with coolant water introduced at the base of the reactor. Alternatively, indirect cooling may be employed using conventional heat exchanger technology. For example, a cooling tower could produce cold water which feeds cooling coils, tube bundles or like means suitably located in the reactor. Tube bundles and coils may be preferred in the absence of strong currents generated by stirring or agitation by turbine blades. Evaporative cooling may be promoted by reducing depth of a reservoir and increasing the surface area. The coolant may be introduced at sufficient velocity to assist in maintaining solids in suspension and admitted water may counteract evaporation losses.

More generally, a temperature control system with heating/cooling functions may be employed. The location and nature of temperature control system, internal or external, direct or indirect, may be varied to achieve the required temperature control of the reactor. For example, when thermophilic bacteria are used, heating to above 60° C. may be required.

Other uses of the process may be exemplified, without limitation, as follows:

FERRIC ION GENERATION

The process of the invention is suitable for converting ferrous ions in solution to ferric ions which may attack minerals, for example uranium minerals, to liberate metal values of economic interest.

TREATMENT OF MANGANESE CONTAINING ORES

Manganese ores may be treated by mixing with a metal sulphide with the parameters for bacterial oxidation being as above described.

Alternatively, manganese ores may be bioleached with the organism Enterobacter at pH controlled between 4 and 8.

SULPHUR REMOVAL FROM COAL

The mineral pyrite occurs with coal and bacterial oxidation using chemolithotrophic bacteria has been used to remove pyrite and reduce sulphur content. The process of the invention may be employed for sulphur removal with the parameters for bacterial oxidation being as above described.

In accordance with the process and reactor systems of the invention the grade of ore, concentrate or other metal containing material may be lower than that for agitated tanks and like reactor systems because of expected lower capital and operating costs.

The invention will be more fully understood from the description of the following examples.

EXAMPLE A

Inert Material

A trial was conducted on an inert mineral used to duplicate sulphide ores and concentrates.

A 10% weight percent slurry with a sizing of 90% passing 16 micrometers was maintained in uniform suspension in a tank with fine air bubbles injected from a close packed array of membrane disc diffusers of EPOM synthetic rubber commercially available from Nopol's under the trade mark PIK300. The diameter of the disc is 304 millimeters at the base of a 1.4 meter diameter by 4 meter high tank. The height of tank is similar to that used in commercial practice.

Air flows of at least 2.4 $Nm^3$/h/diffuser was required to prevent settling of solids. The air flow rates required were within the manufacturer's recommended operating range.

Solids that settled because of a reduction or disruption in air flow were resuspended when the air flow was re-established at 2.4 $Nm^3$/h/diffuser or higher.

These results showed that a typical ground sulphide concentrate with a sizing of 90% passing 12 micrometers would stay in suspension under the same operating conditions.

The operating conditions with respect to air flow were set to duplicate an oxygen demand of 1.5 kilograms per cubic meter hour which is equivalent to that required for bacterial oxidation of sulphide minerals.

EXAMPLE B

Leaching of Refractory Gold Sulphide Concentrate

A sample of gold concentrate containing arsenopyrite and pyrite was ground to a size such that 80% of the particles were less than 15 micrometers in diameter.

The bio-oxidation reactor, constructed from conventional acid resistant material, had a volume of 200 liters and was provided, at its base, with a membrane diffuser as described in Example A. Air was supplied to the diffuser at a rate which maintained the ground solids in suspension. No other agitation was used.

The ground concentrate was mixed with water to produce a slurry at 10% solids on a weight to volume basis. Sulphuric acid was added to the slurry to obtain an acidity level of pH 1.2. Approximately five liters of an inoculum slurry containing a mixture of mineral concentrate and moderately thermophilic bacteria was added to the slurry in the reactor. Thereafter a mixture of nutrients comprising hydrated magnesium sulphate, potassium orthophosphate, and ammonium sulphate was added to the slurry.

The reactor was then heated such that the temperature of the slurry was maintained at 48° C., in the moderate thermophile range.

Air was added to the reactor from a standard compressor, through a flowmeter with a flow valve and thence into a pipe connected to the diffuser.

The air flowrate was controlled to allow a steady stream of bubbles to be emitted from the diffuser. The air was used to maintain the particles in suspension and also to supply the oxygen requirement of the bacterial culture. No additional agitation of the reactor volume was employed. Samples of the slurry were taken on a daily basis to determine the extent of oxidation of the arsenopyrite/pyrite concentrate.

| Time | Oxidation Level (%) | |
|---|---|---|
| (days) | Arsenic | Iron |
| 6 | 100 | na |
| 32 | 100 | 94 |

The final residue in the tank was analysed after the test had proceeded for 32 days.

| | Assay (wt %) | | |
|---|---|---|---|
| | As | Fe | $S^{2-}$ |
| Initial Concentrate | 3.05 | 21.0 | 23.0 |
| Final Residue | 0.03 | 0.4 | 0.1 |
| Oxidation (%) | 99 | 96 | 99 |

$S^{2-}$ is the amount of sulphide sulphur present and determines the amount of total oxidation that has occurred. Based on the analysis of the residue, the oxidation extent was determined.

Gold was then extracted from the residue using conventional cyanide leaching. The residue assayed 67 g/t gold of which 99% was extracted by cyanidation.

EXAMPLE C

Leaching of Copper Concentrate

A sample of copper concentrate containing chalcopyrite (and designated "CP1") was ground to a size such that 80% of the particles were less than 10 micrometers in diameter. Again, the bio-oxidation reactor had a maximum volume of 200 liters and a membrane diffuser, as described in Example A, was installed at the base. Air was supplied at a rate to maintain the ground solids in suspension and maintain oxygen requirement of the bacteria. No other agitation was employed.

The ground concentrate was mixed with water to produce a slurry at 5% solids on a weight to volume basis. Sulphuric acid was added to the slurry to obtain an acidity level of pH 1.2. Approximately 5 liters of an inoculum slurry containing a mixture of mineral concentrate and moderately thermophilic bacteria was added to the slurry in the reactor. Thereafter, a mixture of nutrients comprising hydrated magnesium sulphate, potassium orthophosphate, and ammonium sulphate was added to the slurry.

The reactor was then placed in a heated room such that the temperature of the slurry was maintained at 48° C.

Air was introduced to the reactor from a standard compressor, through a flowmeter with a flow valve and thence into a pipe connected to the diffuser.

The air flowrate was controlled to allow a steady stream of bubbles to be emitted from the diffuser. The air was used to maintain the particles in suspension and provide the oxygen requirement of the bacteria. No additional agitation of the reactor was employed. Samples of the slurry were taken on a daily basis to determine the extent of oxidation of the arsenopyrite/pyrite concentrate.

| Conditions | | CP1 |
|---|---|---|
| Copper Content (%) | | 18 |
| Copper Extraction (%) | Acid Leach only | 4 |
| Copper Extraction (%) | Bacterial oxidation leach using moderate thermophilic bacteria | 84 |

EXAMPLE D

Polymetallic Concentrate

D.1 Leaching with Mesophilic Bacteria

In this example, the reactor used was 125 mm diameter and 1.7 m high. A diffuser, as described in Example A, was installed in the base of the reactor. A sample of mixed polymetallic concentrate (designated "M1") containing a mixture of mineral sulphides was bio-oxidised to extract zinc, nickel, copper and cobalt. The concentrate contained the nickel mineral pentlandite, as well as nickel contained within the structure of the mineral pyrrhotite. Copper was predominately present in the form of chalcopyrite though chalcocite and bornite were also present. Zinc was present as sphalerite. The metal cobalt was associated with the nickel minerals and as the mineral cobalt. The concentrate was ground to a size such that 80% of the particles were less than 15 micrometers in diameter.

The ground concentrate was mixed with water to produce a slurry at 10% solids on a weight to volume basis. Sulphuric acid was added to the slurry to obtain an acidity level of pH 1.2. Approximately half a liter of an inoculum slurry containing a mixture of mineral concentrate and mesophilic bacteria (*Thiobacillus ferrooxidans* and *Thiobacillus thiooxidans*) was added to the slurry in the reactor. Thereafter, a mixture of nutrients comprising hydrated magnesium sulphate, potassium orthophosphate, and ammonium sulphate was added to the slurry.

The reactor was then placed in a heated room such that the slurry temperature was maintained at 350° C.

Air was introduced to the reactor from a standard compressor, through a flowmeter with a flow valve and thence into a pipe connected to the diffuser.

The air flowrate was controlled to allow a steady stream of bubbles to be emitted from the diffuser. The air was used to maintain the particles in suspension and to supply the oxygen requirement of the bacteria. No additional agitation of the reactor was employed. The concentrate was oxidised with metals being released into solution. The level of extraction of the metals was determined by analysing a portion of the liquid fraction of the slurry. When the reaction was complete, the solid and the liquid phases were separated and the solution and the solids analysed.

| Conditions | | M1 |
|---|---|---|
| Copper Content (%) | | 5.7 |
| Nickel Content (%) | | 0.9 |
| Cobalt Content (%) | | 0.06 |
| Zinc Content (%) | | 0.21 |
| Sulphur Oxidation (%) | | 98 |
| Copper Extraction (%) | Bacterial oxidation leach using thermotolerant bacteria | 92 |
| Nickel Extraction (%) | | 97 |
| Cobalt Extraction (%) | | 97 |
| Zinc Extraction (%) | | 95 |

D.2 Leaching with Moderate Thermophiles

In this example, the reactor used was 125 mm diameter and 1.7 m high. A diffuser, as described in Example A, was installed in the base of the reactor. A sample of mixed polymetallic concentrate (designated "M2") containing a mixture of mineral sulphides was bio-oxidised to extract zinc, nickel, copper and cobalt. The concentrate contained the nickel mineral pentlandite, as well as nickel contained within the mineral pyrrhotite. Copper was predominately present in the form of chalcopyrite though chalcocite and bomite were also present. Zinc was present as sphalerite. The metal cobalt was associated with the nickel minerals and as the mineral cobalt. The concentrate was ground to a size such that 80% of the particles were less than 15 micrometers in diameter.

The ground concentrate was mixed with water to produce a slurry at 10% solids on a weight to volume basis. Sulphuric acid was added to the slurry to obtain an acidity level of pH 1.2. Approximately half a liter of an inoculum slurry containing a mixture of mineral concentrate and moderately thermophilic bacteria (*Thiobacillus ferrooxidans* and *Thiobacillus thiooxidans*) was added to the slurry in the reactor. Thereafter, a mixture of nutrients comprising hydrated magnesium sulphate, potassium orthophosphate, and ammonium sulphate was added to the slurry.

The reactor was then placed in a heated room such that the slurry temperature was maintained at 47° C.

Air was introduced to the reactor from a standard compressor, through a flowmeter with a flow valve and thence into a pipe connected to the diffuser.

The air flowrate was controlled to allow a steady stream of bubbles to be emitted from the diffuser. The air was used to maintain the particles in suspension and to supply the oxygen requirement of the bacteria. No additional agitation of the reactor was employed. The concentrate was oxidised with metals being released into solution. The level of extraction of the metals was determined by analysing a portion of the liquid fraction of the slurry. When the reaction was complete, the solid and the liquid phases were separated and the solution and the solids analysed.

| Conditions | | M2 |
|---|---|---|
| Copper Content (%) | | 7.3 |
| Nickel Content (%) | | 0.8 |
| Cobalt Content (%) | | 0.05 |
| Zinc Content (%) | | 0.24 |
| Sulphur Oxidation (%) | | 77 |
| Copper Extraction (%) | Acid leach only | 12 |
| Nickel Extraction (%) | | 10 |
| Cobalt Extraction (%) | | 13 |
| Zinc Extraction (%) | | 24 |
| Copper Extraction (%) | Bacterial oxidation leach using thermotolerant bacteria | 93 |
| Nickel Extraction (%) | | 98 |
| Cobalt Extraction (%) | | 97 |
| Zinc Extraction (%) | | 96 |

D.3 Leaching with Thermophiles

In this example, the biooxidation reactor was of 40 mm diameter and 1.0 m height. A commercially available sintered polymer diffuser was installed in the base of the reactor.

A sample of mixed polymetallic concentrate (designated "M3") containing a mixture of mineral sulphides was bio-oxidised to extract zinc, nickel, copper and cobalt. The concentrate contained the nickel mineral pentlandite, as well as nickel contained within the mineral pyrrhotite. Copper was predominately present in the form of chalcopyrite though chalcocite and bornite were also present. Zinc was present as sphalerite. The metal cobalt was associated with the nickel minerals and as the mineral cobalt. The concentrate was ground to a size such that 80% of the particles were less than 15 micrometers in diameter.

The ground concentrate was mixed with water to produce a slurry at 3% solids on a weight to volume basis. Sulphuric acid was added to the slurry to obtain an acidity level of pH 1.2. Approximately 100 ml of an inoculum slurry containing a mixture of mineral concentrate and thermophilic bacteria (*Sulpholobus*) was added to the slurry in the reactor. Thereafter, a mixture of nutrients comprising hydrated magnesium sulphate, potassium orthophosphate, and ammonium sulphate was added to the slurry.

The reactor was then heated such that the slurry temperature was maintained at 70° C.

Air was introduced to the reactor from a standard compressor, through a flowmeter with a flow valve and thence into a pipe connected to the diffuser.

The air flowrate was controlled to allow a steady stream of bubbles to be emitted from the diffuser. The air was used to maintain the particles in suspension and to supply the oxygen requirement of the bacteria. No additional agitation of the reactor was employed. The concentrate was oxidised with metals being released into solution. The level of extraction of the metals was determined by analysing a portion of the liquid fraction of the slurry. When the reaction was complete, the solid and the liquid phases were separated and the solution and the solids analysed.

| | Conditions | M2 |
|---|---|---|
| Copper Content (%) | | 5.0 |
| Nickel Content (%) | | 0.78 |
| Cobalt Content (%) | | 0.07 |
| Zinc Content (%) | | 0.67 |
| Sulphur Oxidation (%) | | 84 |
| Copper Extraction (%) | Bacterial oxidation leach | 99 |
| Nickel Extraction (%) | using thermotolerant bacteria | 100 |
| Cobalt Extraction (%) | | 98 |
| Zinc Extraction (%) | | 97 |

EXAMPLE E

Zinc Concentrate

In this example, the bio-oxidation reactor was of 40 mm diameter and 1.0 m height. A sintered polymer diffuser, as used in Example D.3, was installed in the base of the reactor.

A sample of zinc concentrate (designated "Z1") containing a mixture of mineral sulphides was treated to extract zinc. The concentrate contained the zinc as the mineral sphalerite. The sample also contained lead sulphide as galena. The concentrate was ground to a size such that 80% of the particles were less than 15 micrometers in diameter.

The ground concentrate was mixed with water to produce a slurry at 5% solids on a weight to volume basis. Sulphuric acid was added to the slurry to obtain an acidity level of pH 1.2. Approximately 100 ml of an inoculum slurry containing a mixture of mineral concentrate and moderately thermophilic bacteria (*Thiobacillus ferrooxidans* and *Thiobacillus thiooxidans*) was added to the slurry in the reactor. Thereafter, a mixture of nutrients comprising hydrated magnesium sulphate, potassium orthophosphate, and ammonium sulphate was added to the slurry.

The reactor was then heated such that the slurry temperature was maintained at 48° C.

Air was introduced to the reactor from a standard compressor, through a flowmeter with a flow valve and thence into a pipe connected to the diffuser.

The air flowrate was controlled to allow a steady stream of bubbles to be emitted from the diffuser. The air was used to maintain the particles in suspension and to supply the oxygen requirement of the bacteria. No additional agitation of the reactor was employed. The concentrate was oxidised with zinc being released into solution. The level of extraction of the zinc was determined by analysing a portion of the liquid fraction of the slurry.

| | Conditions | Z1 |
|---|---|---|
| Zinc Content (%) | | 25 |
| Sulphur Oxidation (%) | | 60 |
| Zinc Extraction (%) | Bacterial oxidation leach using moderate thermophilic bacteria | 97 |

EXAMPLE F

Ferrous to Ferric Conversion

A further test was carried out in a reactor which was 25 mm diameter and 1.0 m high. A sintered polymer diffuser, as used in Examples D.3 and E, was installed in the base of the reactor.

A sample of ferrous sulphate was added to the reactor and diluted with water to obtain a strength of 9 g/l iron. Sulphuric acid was added to the slurry in the reactor to obtain an acidity level of pH 1.2. Extremely thermophilic bacteria (*Sulpholobus*), extracted onto a filter paper to separate them from other residual solution, were added to the slurry in the reactor. Thereafter, a mixture of nutrients comprising hydrated magnesium sulphate, potassium orthophosphate, and ammonium sulphate was added to the slurry.

The reactor was then heated such that the solution temperature was maintained at 70° C.

Air was introduced to the reactor from a standard compressor, through a flowmeter with a flow valve and thence into a pipe connected to the diffuser.

The air flowrate was controlled to allow a steady stream of bubbles to be emitted from the diffuser. The air was used to maintain the particles in suspension and to supply the oxygen requirement of the bacteria. No additional agitation of the reactor was employed.

The ferric solution was oxidised so that the ferrous ion was converted into ferric ion. The level of conversion of the ferrous ion was determined by titration with potassium dichromate.

Modifications and variations may be made to the process and reactor system of the present disclosure without departing from the scope of the invention.

The claims defining the invention are as follows:

1. A process for recovering metals from materials containing them by bio-oxidation comprising;

a) treating, in a non-mechanically agitated reactor, a slurry comprising a metal containing material with bacteria capable of promoting extraction of metals from said metal containing material; and, b) introducing an oxygen-containing gas to the slurry within the reactor by aeration means.

2. The process of claim 1, wherein said oxygen-containing gas is introduced to said slurry in bubbles of controlled size.

3. The process of claim 2, wherein said aeration means includes at least one diffuser selected from the group consisting of tubular, dome-shaped, doughnut shaped and disc shaped diffusers.

4. The process of claim 1, wherein said reactor is rakeless.

5. The process of claim 1, wherein gas introduced to the reactor further includes carbon dioxide.

6. The process of claim 1, wherein said bacterial culture includes at least one microorganism selected from the group consisting of *Thiobacillus ferroxidans*, and *Thiobaccillus thiooxidans, Leptospirillum ferroxidans, Sulphobacillus thermooxidans, Sulpholobus brierleyi, Sulpholobus BC* and *Sulpholobus acidocaldarius.*

7. The process of claim 1, wherein said metal containing material contains at least one metal selected from the group consisting of non-ferrous base metals, precious metals and rare earth metals.

8. A reactor system for bio-oxidation treatment of metal containing materials comprising at least one rakeless reactor having a reactor volume provided with aeration means for introducing an oxygen containing gas to the reactor volume for maintaining said metal containing material in suspension and bacterial viability.

9. The reactor system of claim 8, wherein said at least one reactor is a tank or vat.

10. The reactor system of claim 9, wherein said at least one reactor includes a reservoir lined with a liquid impermeable barrier.

11. The reactor system of claim 9, wherein said at least one reactor has a feed end and a discharge end with a base of the reactor having a descending slope towards the discharge end.

12. The reactor system of claim 8, wherein said aeration means includes at least one diffuser.

13. The reactor system of claim 12, wherein each diffuser is placed adjacent the base of the reactor.

14. The reactor system of claim 12, wherein said diffuser is selected from the group consisting of a tubular, dome shaped, dougnnut shaped and disc diffuser.

15. The reactor system of claim 8, wherein said aeration means is located in a pipeline communicating with said at least one reactor.

* * * * *